Feb. 13, 1962     D. H. FRYKLUND     3,020,937
CABLE MACHINE

Filed Oct. 31, 1957     12 Sheets-Sheet 2

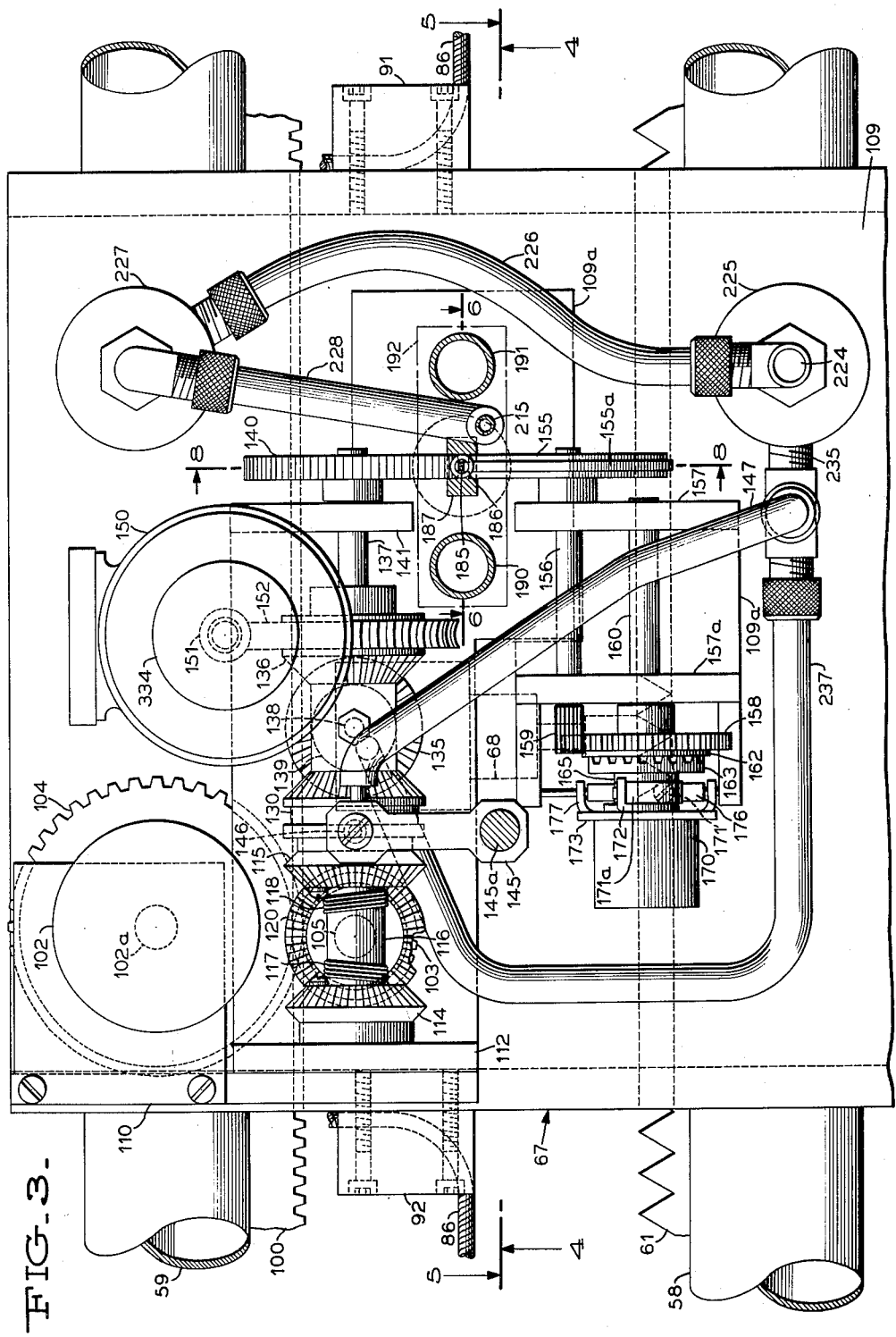

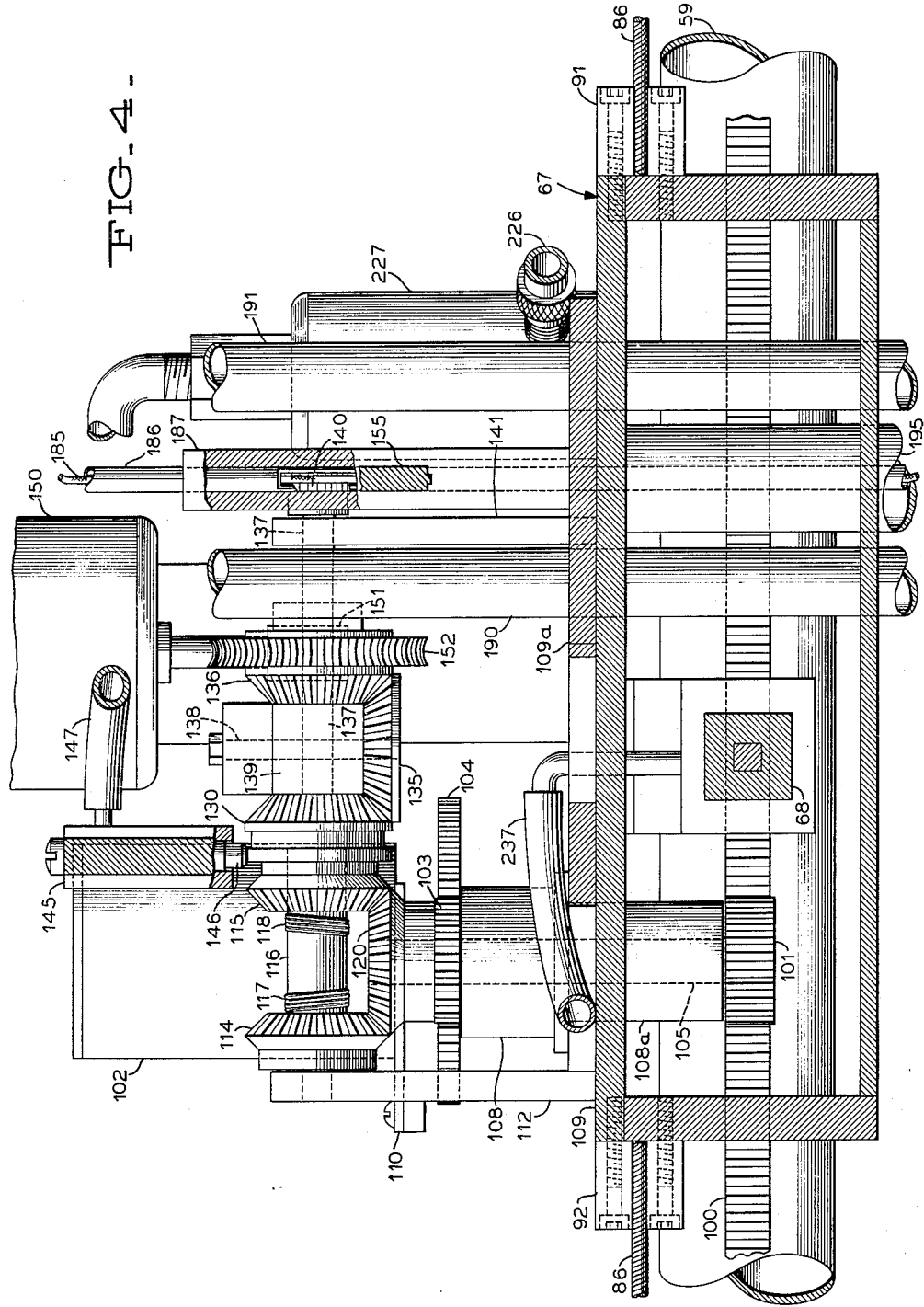

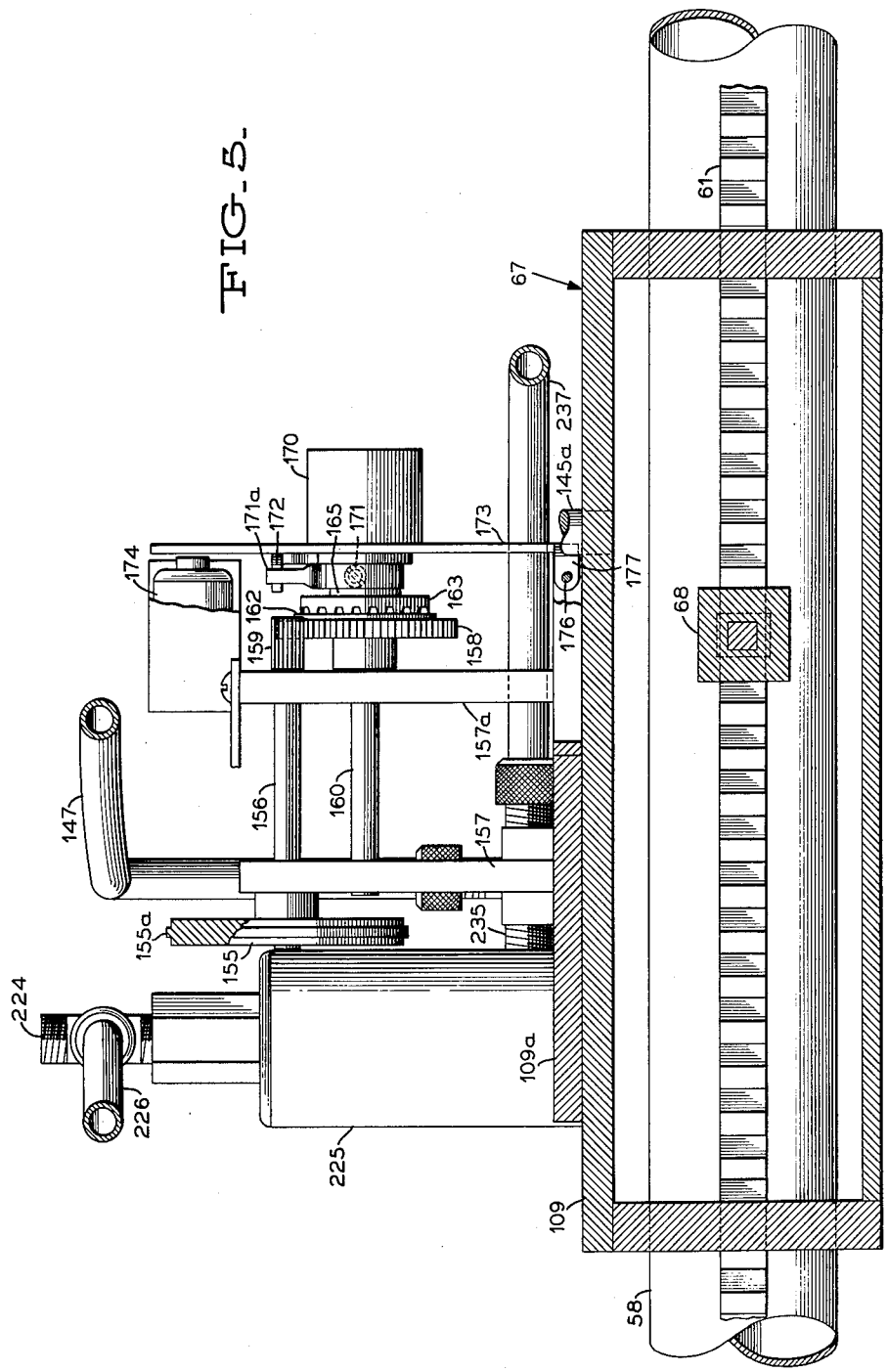

Feb. 13, 1962 D. H. FRYKLUND 3,020,937
CABLE MACHINE
Filed Oct. 31, 1957 12 Sheets-Sheet 6
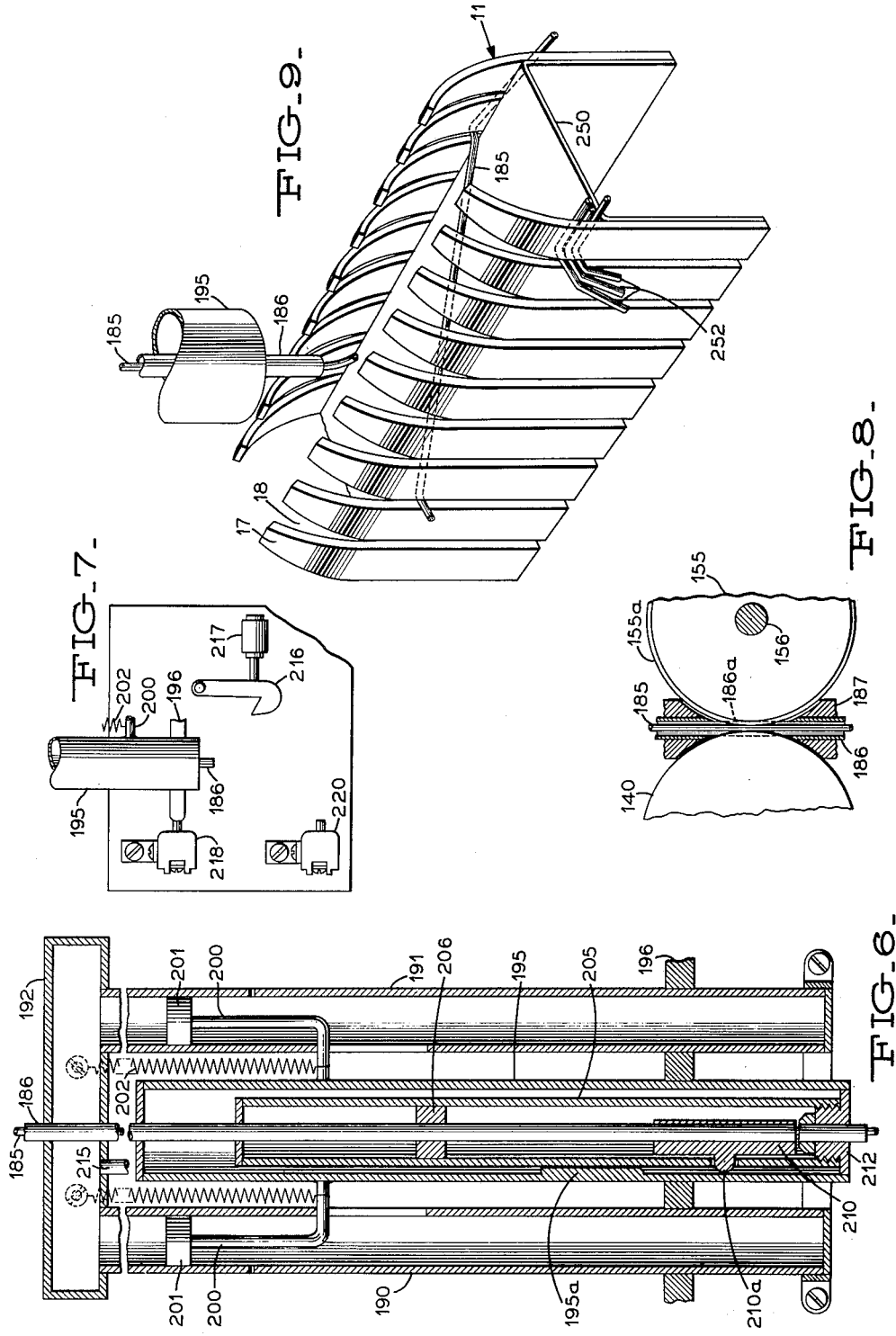

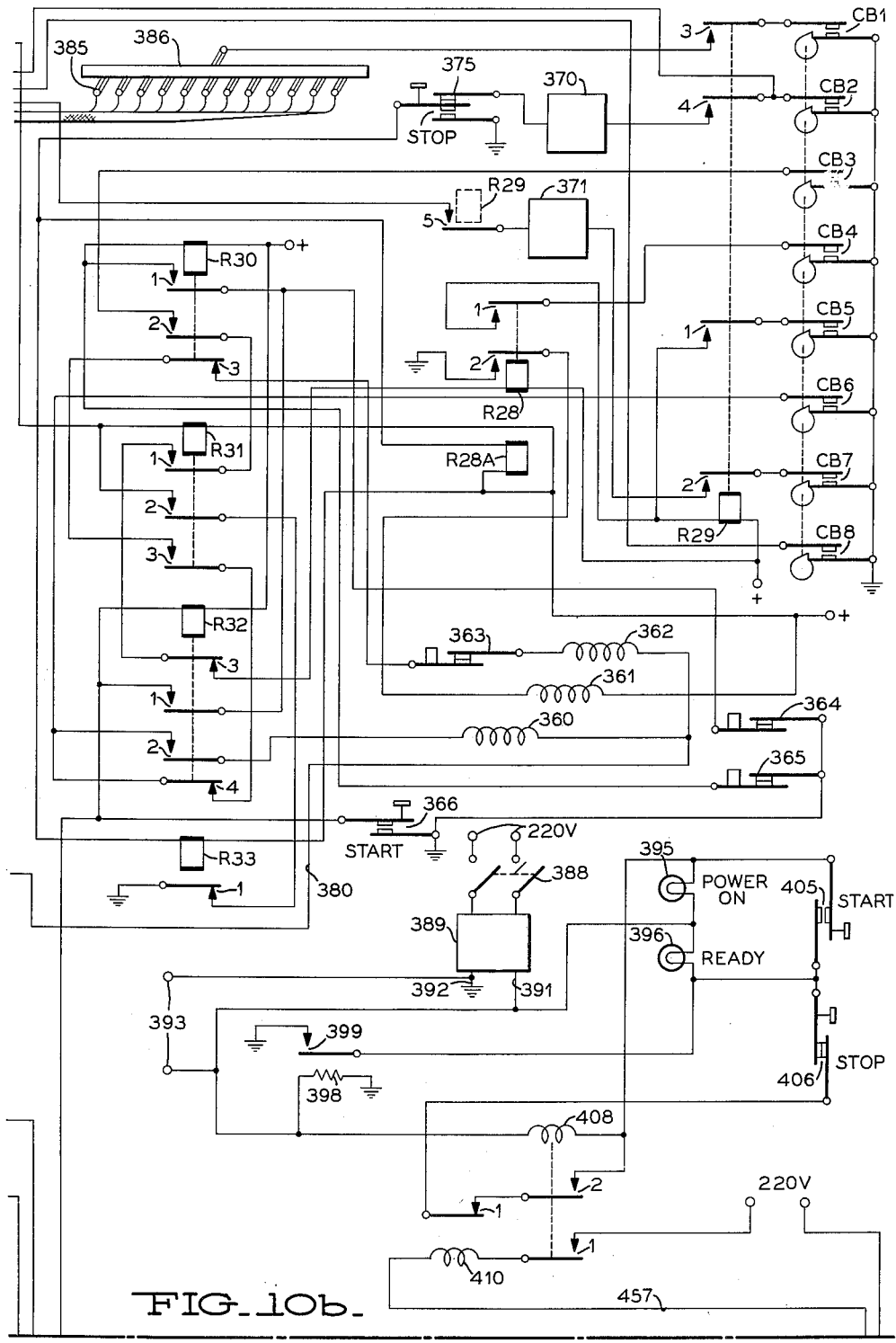
FIG_10b.

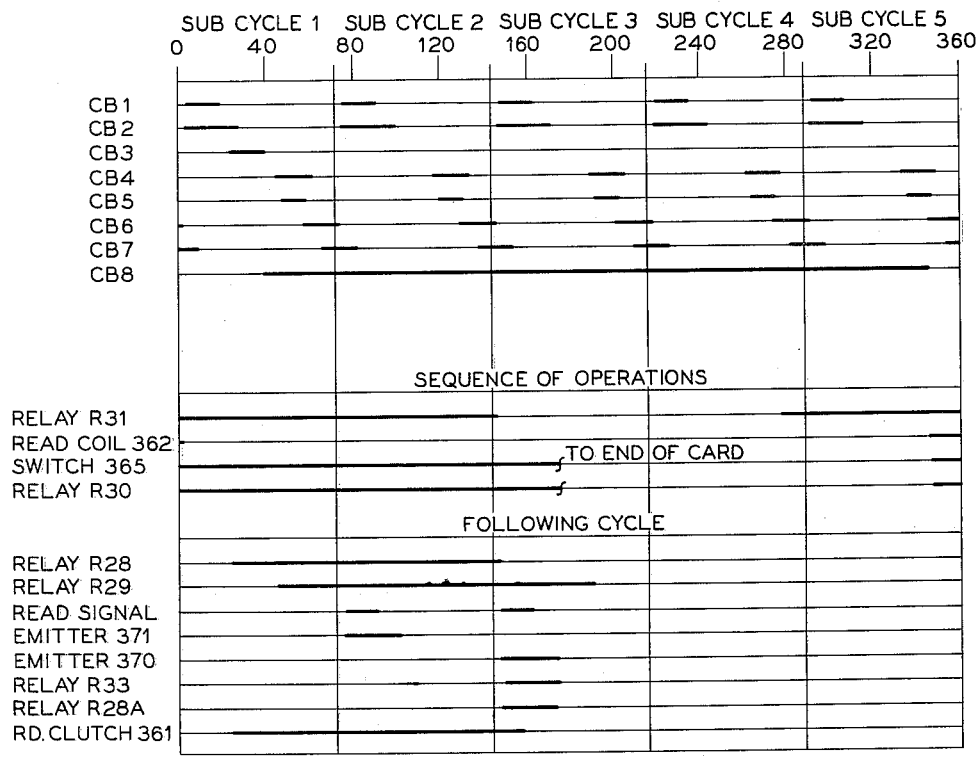
FIG_11_
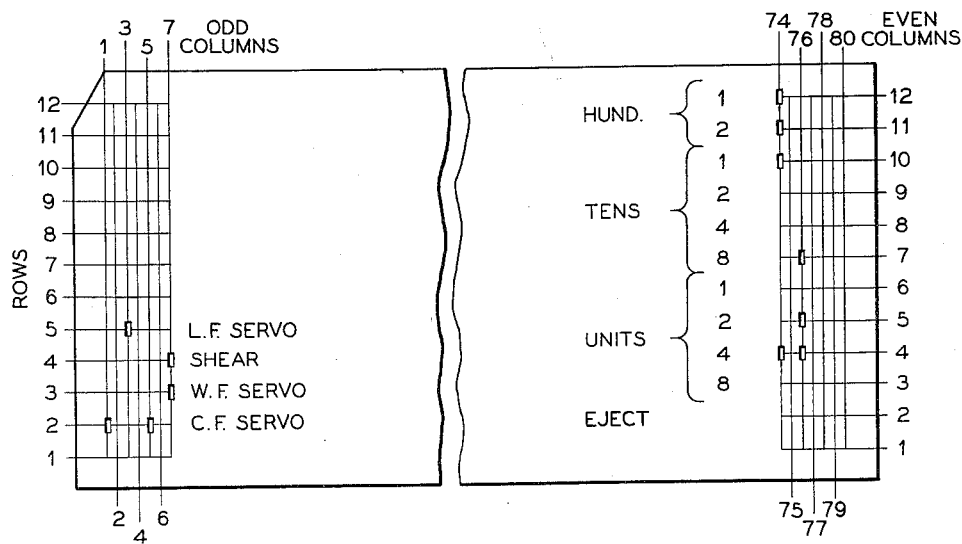
FIG_12_

Feb. 13, 1962
D. H. FRYKLUND
3,020,937
CABLE MACHINE
Filed Oct. 31, 1957
12 Sheets-Sheet 12
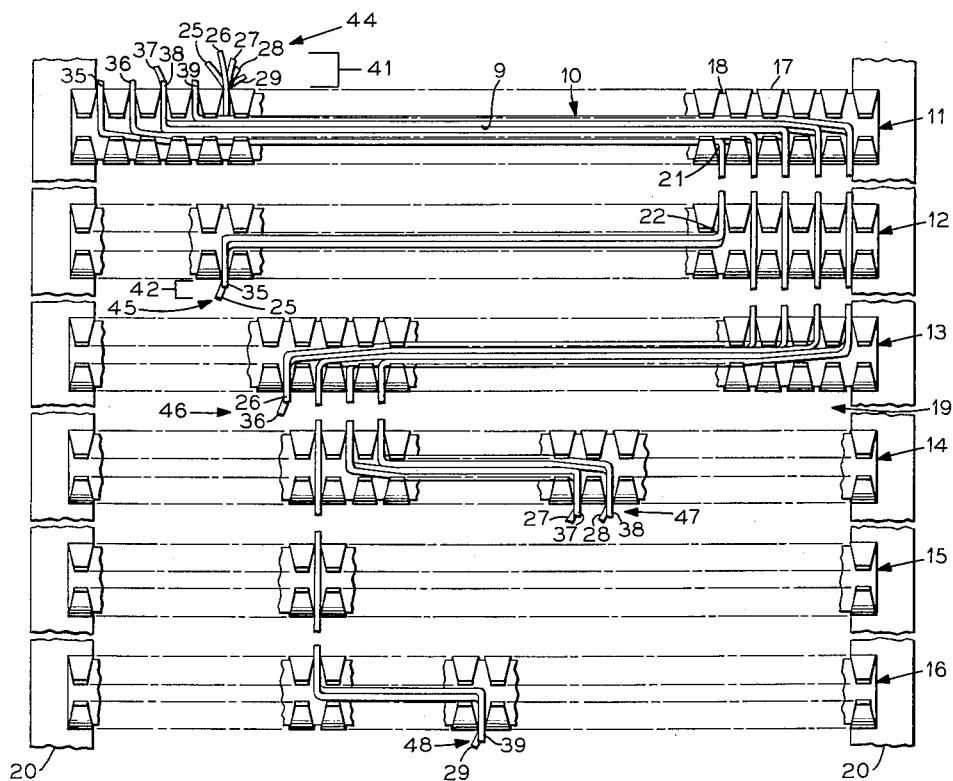
FIG_13_
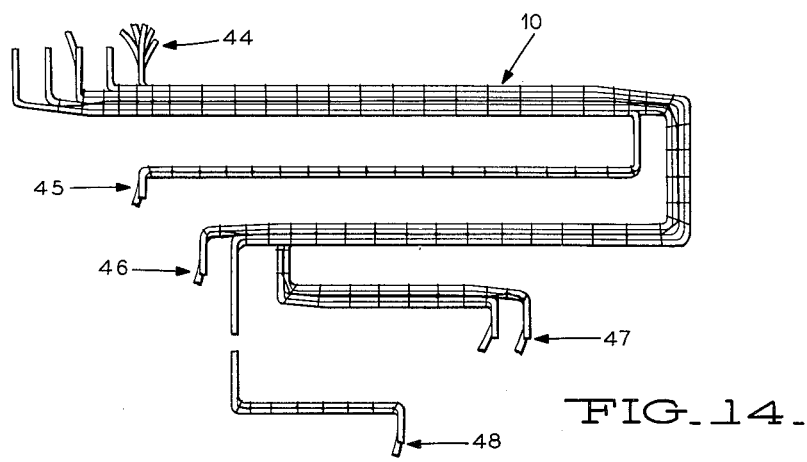
FIG_14_

United States Patent Office 3,020,937
Patented Feb. 13, 1962

3,020,937
CABLE MACHINE
Donald H. Fryklund, Plainfield, N.J., assignor to International Business Machines Corporation, New York, N.Y., a corporation of New York
Filed Oct. 31, 1957, Ser. No. 693,584
4 Claims. (Cl. 140—71)

This invention relates to a machine for forming a length of flexible wire into a predetermined configuration by mechanical apparatus in response to a programmed source of information.

In complex machines such as those used in machine accounting and computation work where there are literally thousands of elements in the machines to be electrically interconnected in predetermined arrangements, the number of separate wires necessary to make the various connections becomes very great. Likewise, it is quite often necessary to make electrical connections to certain elements in other associated machines. In addition, as a general rule a central electrical power supply is also directed to each of the machines of the machine combination. In order to bring some order into the internal wiring of these machines and to the external machine combinations, it has been standard practice to bind the individual lengths of wire together to form a cable.

Heretofore, in order to form a cable, the length of wire necessary to connect one element to an associated element must be first determined for each combination. A pegboard is then constructed by locating pegs at the various points where the various wires must change direction, begin or terminate. Each length of wire must then be manually arranged in position on the pegboard. When all the wires connecting all of the elements have been manually laid out on the pegboard in the proper configuration, the operator binds the wires together to form a unitary cable after which the cable is removed and wrapped, if desired. Each cable must be thus manually laid out in the same manner, and it can be appreciated that this can be a time consuming, expensive operation particularly in high production apparatus having complicated circuitry.

In the present invention, the major portion of the various functions previously performed by manual operations are automatically achieved through electrical and mechanical means. The main elements of this invention are:

(1) A card reading controller which reads information stored in punched cards or the like, selects a unit in the wire forming apparatus in accordance with the information stored in the card, and furnishes quantitative information thereto to control this unit.

(2) A wire feeding head which, in response to signals from the card reading controller, assumes various coordinate positions and further, through mechanism contained thereon, measures out wire in accordance with both the movement of the head and by independent instructions from the card reading controller.

(3) A storage arrangement for the wire measured out by the wire feeding head which retains the wire in the configuration as formed by the sequential movements of the cable head in response to the instructions from the card reading controller.

As mentioned previously, this invention operates in accordance with data stored on punched cards. These cards are punched in accordance with data which is available for the type of cable to be formed. The means by which the data is obtained does not form part of the present invention, and will not be described except to state that the data could be determined empirically by manually making one cable and recording the results or by presenting the available information, i.e., distance between elements to be connected, breakout, number of wires, etc., to a properly programmed computer which would punch cards or otherwise record to indicate the various steps necessary to form the simplest cable.

It is therefore an object of this invention to provide an apparatus for automatically forming a flexible wire into a desired configuration.

It is another object of this invention to provide a digital data card controlled apparatus which mechanically forms a flexible wire into a desired configuration.

It is a further object of this invention to provide automatic cable forming apparatus which retains a formed wire in a desired configuration.

Another object of this invention is to provide a punched card controlled cable forming apparatus which forms a continuous flexible wire into a desired configuration, severs the continuous wire at terminal points as indicated by the punched card, and retains the desired wire configurations for binding into a unitary group.

Other objects of the invention will be pointed out in the following description and claims and illustrated in the accompanying drawings, which disclose, by way of examples, the principle of the invention and the best mode, which has been contemplated of applying that principle.

In the drawings:

FIGURE 3 is a top plan view of the wire feed head diagrammatically shown in FIGURES 1 and 2.

FIGURE 4 is a longitudinal vertical cross-sectional view of the wire feed head taken along the lines 4—4 of FIGURE 3 and looking in the direction of the arrows.

FIGURE 5 is a longitudinal vertical cross-sectional view of the wire feed head taken along the lines 5—5 of FIGURE 3 and looking in the direction of the arrows.

FIGURE 6 is a vertical cross-sectional view, on a reduced scale, of the tamping apparatus of the wire feed head taken along the lines 6—6 of FIGURE 3.

FIGURE 7 is a diagrammatic showing of the tamping apparatus with associated switches and stop which are located directly below the apparatus of FIGURE 6.

FIGURE 8 is a vertical sectional view, on a reduced scale, of the wire feeding wheel and measuring wheel, taken generally on the line 8—8 of FIGURE 3.

FIGURE 9 is an isometric view of a number of teeth in the storage device and the lower portion of the wire feed head.

Figure 1:
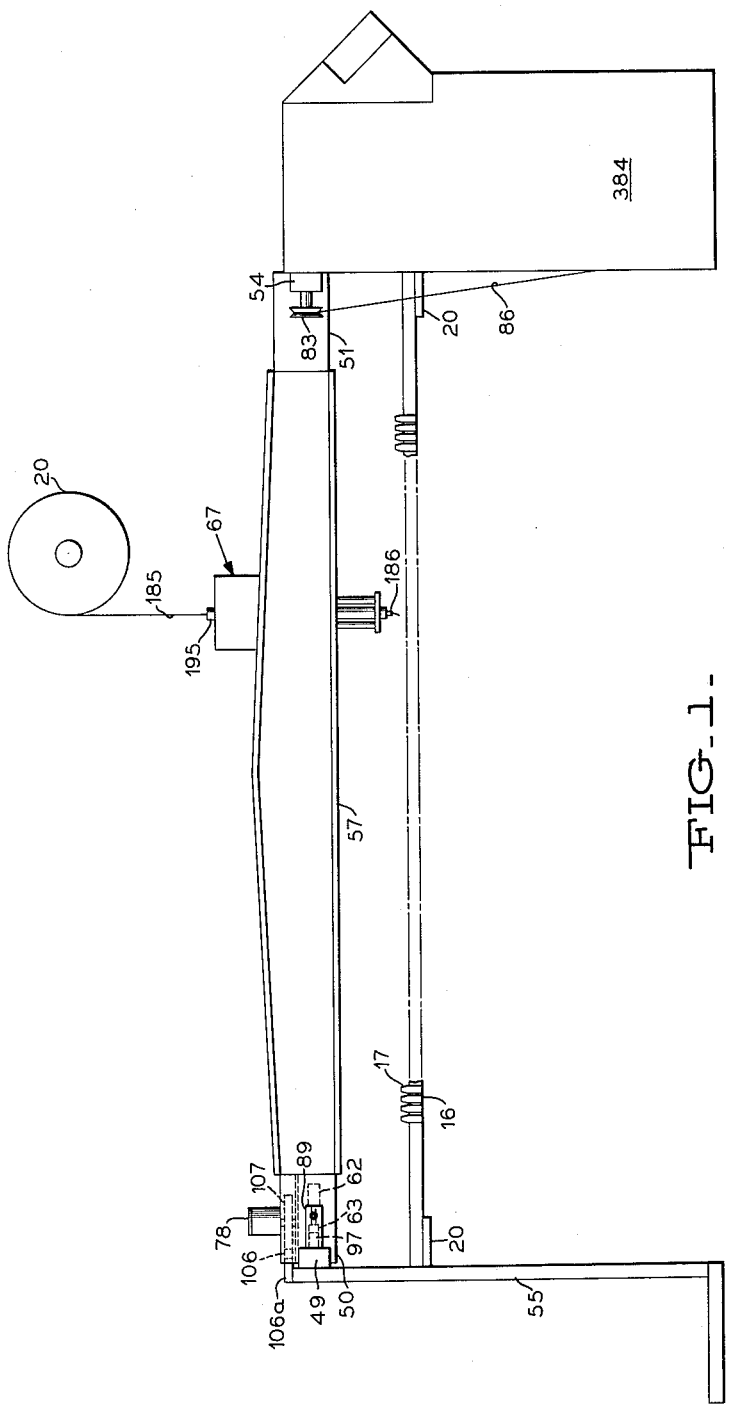
FIGURE 1 is a side elevational view of the cable forming machine showing the general construction thereof.

FIGURES 10a through 10d disclose the electrical controller of the present invention.

FIGURE 11 is a timing diagram of the card reader.

FIGURE 12 illustrates the format of a punched card used in the present invention.

FIGURE 13 is an idealized showing of a cable as it would appear after being placed in the storage device of the present invention prior to binding; and FIGURE 14 is a top plan view of the completely bound cable shown in FIGURE 13.

*General description of the cable*

Referring more particularly to the drawings for a detailed description of the cable formed on the instant apparatus, there is diagrammatically shown in FIG. 14 a finished cable 10 having a plurality of terminal points 44–48. To be connected to the wire ends at these terminal points are various electrically responsive elements to perform the required functions. The number of elements and the wires therebetween which electrically connect these elements would vary in accordance with the functions required. A cable such as shown in FIG. 14 has the desirable property of being a unitary structure capable of transportation from an assembly department to the place where it is to be used and allows for the manufacture of cables according to predetermined specifications and utilization of the cable at some future time.

Shown in FIG. 13 is the cable 10 as it would appear after the forming apparatus of the present invention had completed the wire laying operation on the storage device or rack 19 but before being bound and removed. It can be seen that the cable 10 includes a plurality of wires 9 providing a number of wire ends at points 44–48 which are spaced apart by varying distances since each of these wire ends are to be connected to suitable elements located adjacent these points when mounted in a machine for which the cable was designed. To achieve the required distance between terminal points it is necessary that the wires forming the cable be placed on the storage frame or rack 19 in a rick-rack fashion. However, it is obvious that if two terminal points are to be in close proximity, the wires may extend directly across the storage rack without any reversals in direction.

The rack 19 comprises a number of spaced parallel rows of inverted channel members 250 (see FIG. 9). Secured on the opposite side walls of the channels are a plurality of spaced upwardly or vertically directed teeth or projections 17. The projections 17 disposed on opposite sides of each channel 250 are aligned not only on the same channel, but from channel to channel. The portion of the teeth projecting upwardly above the channel are tapered toward the free ends and are likewise bowed or bent inwardly in a chord of an arc. The inwardly directed aligned teeth on each channel provide a continuous opening or passage through which wire may be inserted to lie against the surface of the inverted U-shaped channel members 250. This arrangement may be defined as a wire retainer of which there are six, 11–16 in FIG. 2. The number of individual wires which can be secured between teeth will vary in accordance with the design of the teeth 17 although, in the actual machine, spaces 18 each have the capacity of holding up to five wires. The individual wires 9 are stacked one on top of another as shown at terminal 44 and in FIG. 9 and, therefore, the number of wires which may be secured between adjacent teeth 17 is dependent upon both the depth of the space between teeth and the taper of the teeth.

The cable 10 shown in FIGS. 13 and 14 is not designed for any particular application so that operation of the apparatus in forming this cable is hypothetical and is merely to illustrate the method by which a cable is formed. In this example, it is assumed the proper lengths of wire to each location have been determined from some reference point and the ends of wires 25–29 are to be connected to a power supply at terminal point 44, to furnish positive potential to the ends of the wires at terminal points 45–48 located at varying distances from the terminal 44 as illustrated. At each of these terminal points is located the ends of wires 35–39 which, in cooperation with wires 25–29 and some elements located adjacent points 45–48, operate to complete a circuit back to point 44. The ends of the wires 35–39 located at point 44 are to be connected to various control elements which, when actuated, furnish a ground potential to the said wires 35–39. When any circuit is completed, the element to be controlled, located at points 45–48, will be operated.

*Method of laying wire*

The individual strands of wire are placed between the teeth 17 by means of a wire feed head 67 to be described hereinafter through which wire is fed from a reel or other storage device 20, FIG. 1. The wire feed head 67, as mentioned previously, is movable in two directions so that it may assume any discrete coordinate position in response to signals from a controller 384 which directs the wire laying operation. To lay the wires 25 and 35, the wire feed head moves as follows: The wire feed head first goes to terminal point 44 just outside the wire retainer 11 where it measures out a length of wire 41 which is called the breakout. The head then moves laterally to the middle of the retainer 11 with the payed out wire passing through a space 18 proved by adjacent teeth 17. The measured length 41 of wire 25 will be caught between adjacent teeth 17, FIG. 9, and held frictionally from movement. The head 67 then moves longitudinally down the center of retainer 11 placing the wire for storage on the surface of channel 250 (FIG. 9). When the head reaches point 21 adjacent the end of the retainer 11, it abruptly changes directions and moves laterally through the related spaces on adjacent retainers to the center of the next retainer 12. When the point 22 is reached, the head direction is changed and moves longitudinally to a position opposite terminal 45 and then moves laterally to the point 45. At this point, a length of wire 42 is measured out for the breakout and the wire 25 is then severed from the supply and tamped down into the slot 18. Since the head is adjacent point 45, the wire 35 may be laid by repeating all the motions in which wire 25 was laid but in the opposite direction, except that wire 35 terminates in a slot 18 displaced from the slot in which wire 25 is contained. The remaining wires forming the cable 10 are laid in a substantially identical manner to wires 25 and 35, except that the cutoff or terminal end locations could vary to any of the slots provided.

*Cable machine (FIGS. 1 and 2)*

FIGURE 1 shows the general mechanical layout of the cable machine. A card reader and controller 384 (FIG. 10), shown schematically, performs the functions of reading punched cards sequentially and selecting various predetermined circuits in response to the holes punched therein.

The wire feed head 67 (FIGS. 3–8) is movable to any of a plurality of coordinate positions by means of the wire cable 86 which is attached at 91 and 92 to the wire feed head. The wire feed head 67 is slidable longitudinally on horizontal cylindrical guides 58 and 59 shown more clearly in FIG. 3. The tubular guides 58 and 59 are in turn secured to end carriages 50 and 51, FIGS. 1 and 2, which are supported for horizontal lateral movement by rollers 52 on races 40 and 54 forming part of the end supporting structure 55 and 56. A rackway 100 is secured to the guide member 59 and meshes with a gear 101 journaled on said wire feed head. The gear 101 in turn operates a potentiometer 102 to furnish the controller 384 a signal indicative of the longitudinal position of the wire feed head. A solenoid 68 is mounted on the wire feed head 67 and when energized removes a detent 69 from a detent way 61 mounted on the tubular guide 58. The detent 69 operates to lock the wire feed head in any one of a plurality of longitudinal positions. There is a detent position for each space or slot 18.

Similar structure to that shown on the cable head is mounted on the end carriage 50. A detent 63, controlled by a solenoid 62, is shown in operated position to prevent lateral movement of end carriages 50 and 51. The detent 63 cooperates with a detent way 97 secured to the way 49. A rackway 106a is secured to the end support means 55 and meshes with a gear 106 mounted on the end carriage 50. The gear 106 meshes with gear 107 which in turn is connected to a potentiometer 78 to furnish a variable voltage to the controller 384 to indicate the position of the end carriages and consequently the lateral position of the wire feed head 67.

A reversible motor 96 has mounted on its shaft a cable drum 95 on which a portion of the cable 86 is spirally wound in an endless manner so that as the cable is wound on one end of the drum a like amount is removed from the other end. The cable 86 may be traced from the drum 95, to and around a pulley 83 mounted on the support means 56, around a pulley 73 mounted on the end carriage 51, through the tubular guide 58, to and around the pulley 76, mounted on the end carriage 50, and terminates at the securing bracket 92 on wire feed head 67. From the bracket 91, on the opposite side of head 67, wire 86 proceeds around pulley 77 on end carriage 51 to a pulley 81 mounted on the end support means 56 to the opposite end of the drum. By selectively operating the detent 63 or 69, the wire feed head 67 will be secured in fixed longitudinal position and the end carriages will be movable or the end carriages will be locked in position and the wire feed head will be movable. It is readily seen that if end carriages 50 and 51 are locked in fixed positions and detent 69 is released by energizing solenoid 68, the movement of cable 86 will move wire feed head 67. When wire feed head 67 is fixed longitudinally by the detent 69 and the detent 63 is withdrawn from detent way 97, the pulleys 81 and 83 rotate only and movement of cable 86 moves the end carriages 50 and 51 to obtain lateral movement of head 67.

To prevent canting of the end carriages 50 and 51, a parallel arrangement of wires 84 and 85 are secured respectively to the brackets 90, 88 and 89, 87 of the end support means. The wire 85 extends from bracket 89 around pulleys 74 and 75 to the bracket 87, while the wire 84 extends from bracket 90 around pulleys 81 and 79 to the bracket 88. To add additional support or rigidity to the structure, channel members 57 are mounted between carriages 51 and 52.

*Wire feed head (FIGS. 3–5)*

Figure 2:
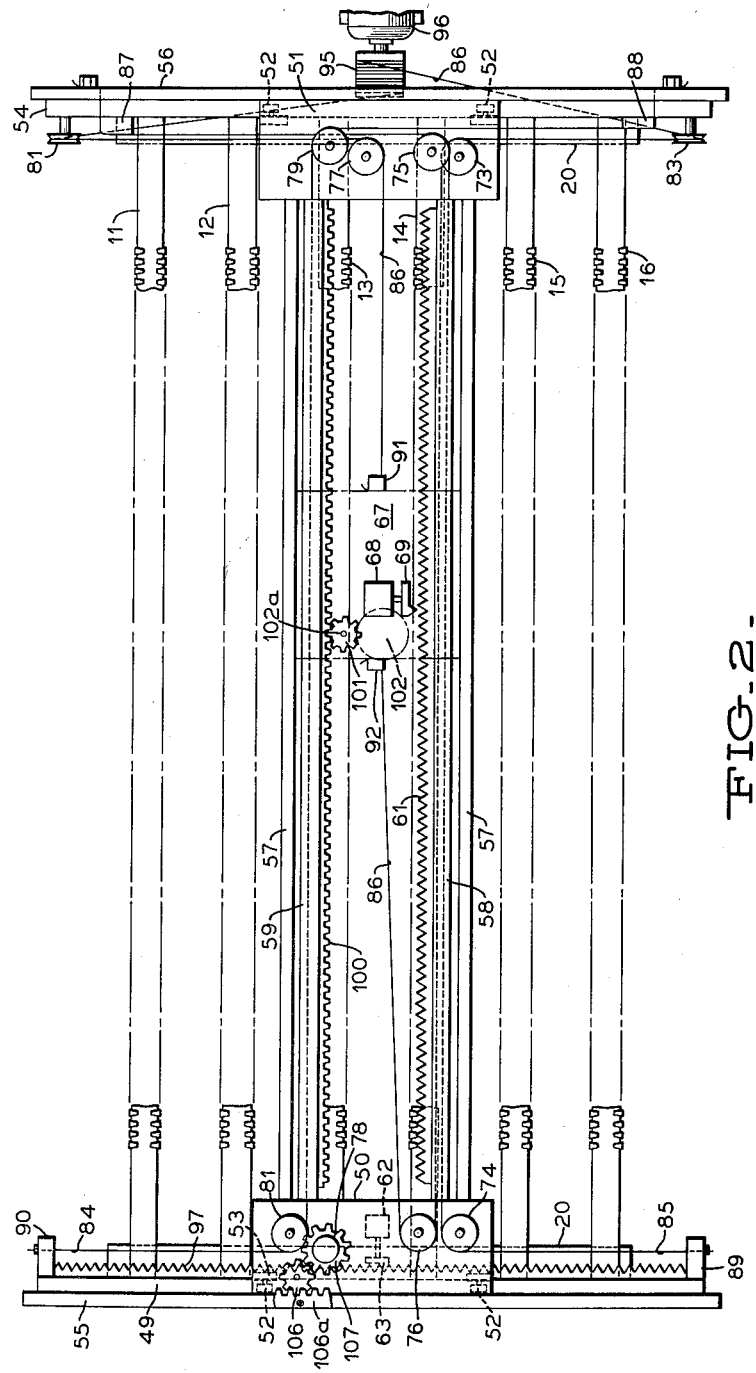
FIGURE 2 is a top plan view of the cable forming machine showing only the essential elements which comprise the lateral and longitudinal feed.

Referring now to FIG. 4, the gear 101 which meshes with the rackway 100 is secured to a shaft 105. This shaft is journaled in a supporting housing 108 formed so that the lower portion 108a is of reduced diameter, while the upper portion is large enough to overlie the hole formed in a supporting plate 109 and mounting plate 109a of the wire feed head 67. Attached adjacent the other end of the shaft 105 is a spur gear 103 for driving a meshing gear 104 which in turn is directly connected to the potentiometer 102 to drive the same, as shown in FIG. 2. Also connected to shaft 105 is a miter or bevel gear 120 which meshes with a pair of bevel bears 114 and 115 freely journaled on a shaft 116 that is supported by a stanchion 112.

To enable the wire feeding operation to be operative for both directions of longitudinal movement of the wire feed head and to measure out wire during this movement, it is necessary that a unidirectional motion be conveyed to the mechanism which forces the wire to the rack teeth 17. This type of operation is effected by the bevel gears 114 and 115. Each bevel gear 114 and 115 includes a self-energizing spring clutch 117 and 118, respectively. During any longitudinal movement of the wire feed head 67, the bevel gears 114 and 115 are rotated in opposite directions. However, both springs 117 and 118 are wound in the same direction. Therefore, with longitudinal cable head movement in one direction, the gear 114 rotates in a direction such as to tighten the spring 117 to grip the shaft 116, the spring 118 will be urged to loosen and slip by the oppositely rotating gear 115. Thus, the rotary motion to the shaft 116 is conveyed in the direction of the gripping spring 117.

The same result is achieved when the longitudinal wire feed head movement is reversed. Since the rotation of the bevel gear 115 is reversed, it now rotates in the same direction as the bevel gear 114 during movement of the wire feed head in the opposite direction. In this instance, the spring 118 is tightened to grip and rotate the shaft 116 in the same direction as in the previous case. It is therefore seen that the direction of longitudinal movement of the wire feed head 67 as monitored by the spur gear 101 and the connected shaft 105 is converted into a unidirectional motion of the shaft 116 regardless of the direction of movement of the wire feed head.

Connected to shaft 116 is a miter or bevel gear 130 forming part of a differential gear system used to alternately measure the wire 185 in accordance with independent information from the controller or through wire feed head movement. The gear 130, which is driven by head movement, always moves in the same direction by virtue of the spring clutches 117 and 118 associated with the shaft 116 to transmit motion through a spider gear 135 and a supporting block 139 secured to a shaft 137 extending through a gear 136 and supporting stanchion 141 to a wire feeding wheel 140, FIG. 3. When the gear 136, which is operated by a wire feed motor 150 by means of a worm 151 and worm gear 152, is stationary and gear 130 is rotated, the spider gear 135, rotatable on a shaft 138, will also rotate about the axis of the shaft 137 to rotate the same in the required direction. A brake 146 is provided to act against the hub of the gear 130. This brake is a fluid pressure operated piston supported by means 145 and under the control of fluid pressure supplied by associated tubing 147 to prevent movement of the gear 130 during an independent wire measuring operation when the wire feed head 67 is stationary or moving laterally.

Referring to FIGS. 3 and 4, the wire feed motor, shown at 150, is actuated by signals from the controller at terminal points to feed out the correct breakout of wire. This motor 150 is connected by means of the worm 151 to the worm gear 152 which is mounted on the hub of the gear 136. When the brake 146 is actuated to lock the gear 130 against improper rotation, and the wire feed motor 150 is operated, motion will be transmitted through gears 151, 152, 136 to gear 135 which, in turn, acting on the now stationary gear 130, pivots about the axis of the shaft 137 and transmits the motion to the same to drive the wire feeding wheel 140. As was noted previously, the movement of wire feed head 67 always rotates shaft 116 in the same direction to feed wire to the storage teeth. The motor 150 may be rotated in either direction but, for the usual operation of laying wire, the motion to shaft 137 will be the same as that produced by movement of the cable head. A tachometer 334 is mounted on the top of the motor 150 to prevent overshooting of the same in a manner to be described hereinafter.

A measuring wheel 155, FIGS. 3 and 8, is mounted for rotation with a shaft 156 which is supported by members 157 and 157a. The wire 185 to be laid passes through a guide means or tube 186, and is frictionally engaged by the driving wheel 140 on one side and the measuring wheel surface 155a on the opposite side through a cutaway portion in guide tube 186, FIG. 8. Connected to the opposite end of the shaft 156 is a gear 159 that meshes with a gear 158 mounted for rotation with a shaft 160 also supported by the members 157 and 157a. On the face of gear 158, FIGS. 3 and 5, is a frictional surface 162 adapted to cooperate with a clutch disc 163 having a plurality of serrations. This clutch disc is connected to a shaft 165 for driving a potentiometer 170 mounted on a plate or armature 173. This potentiometer is utilized to measure the breakout length of wire at the various terminal points. Connected at 171 to the clutch shaft 165 is a helical spring 171a which cooperates with an ear 172 formed as part of the plate 173. The plate 173 is pivoted at 176 to the support 109 by means of ears 177.

An electromagnet 174 is mounted on the upper end of the support 157a and is adapted when energized to draw the armature 173 and consequently shift the clutch disc 163 axially into engagement with the frictional surface 162 to thereby prepare the potentiometer 170 for rotation.

The helical spring 171a performs the function of moving the potentiometer 170 to a zero reading when the electromagnet is released. It is therefore seen that the potentiometer 170 will be clutched to the gear 153 whenever it is desired to measure a length of wire for breakout. At other times, the measuring wheel 155 will move with the wire being forced through the guide means 187, but said wire will not be measured by the potentiometer 170.

The guide tube 186, shown particularly in FIGS. 3, 4 and 6, channels the wire 185 supplied from a reel 20, FIG. 1. The guide tube 186 is carried in a rectangular support 187, FIG. 3, which is connected to the base support 109a of the wire feed head 67 (see FIG. 4). A slot 186a is formed in the tube 186 and the member 187 to allow the driving wheel 140 and the measuring wheel 155 to coact upon the wire 185 passing through the guide tube 186.

The operation of the guide assembly will be explained with reference to FIG. 6. As can be seen from this figure, a pair of vertically extending parallel spaced cylinders 190 and 191 connect to a common upper header 192. The guide tube 186 extends through the entire assembly. The portion of the guide assembly shown as broken below the header 192 lies below the top of the cable head. The upper portion of the guide assembly has been omitted in FIG. 4 and shown outlined in FIG. 3 and caps the two tubes 190 and 191. The rectangular support 187, FIGS. 3 and 4, has been entirely omitted from the showing in FIG. 6 to simplify the description of the apparatus. Disposed between the cylinders 190 and 191 is a vertically extending tamping cylinder 195 securely fastened to a movable support plate 196 to prevent lateral movement of the tamping cylinder. The plate 196 is formed to slide on the tubes 190 and 191. Also connected to the cylinder 195 are L-shaped piston rods 200 carrying pistons 201 at the upper ends thereof. Springs 202 are connected to the piston rods 200 and to the head 192 to spring bias the entire cylinder 195 to its topmost position. Disposed within the cylinder 195 is a closed concentric cylinder 205 which is attached to the guide tube 186 by means of a spacer 206 and the top closure portion of the cylinder 205. At the bottom portion of the cylinder 205 is a cap member or plug 212 for securing the lower portion of guide 186. A cam follower 210 having a protrusion or projection 210a formed thereon is attached to the guide means 186 and cooperates with a cam surface 195a formed on the inside of the cylinder 195 to move the guide 186 laterally when the cylinder 195 is moved to its lowest position. Of the various elements shown in FIG. 6, the tamping cylinder 195 with its pistons 201 and plate 196 is the only one thus capable of vertical movement.

The operation of the apparatus shown in FIG. 6 is to tamp the wire into the slots 18 between the teeth 17, and to sever the wire 185 when required. With no air pressure acting on the upper surface of the pistons 201, the springs 202 hold the cylinder 195 in its raised or retracted position, which is the normal position for cable laying operations. To initially insert the first portion of a wire in one of the spaces 18, air is introduced into the header 192 by means of a tube 215. This fluid under pressure forces the pistons 201 downward to a point where the cylinder 195 will force the wire into the selected slot 18. However, this downward motion is not sufficient to sever the wire but is sufficient to bring the cylinder 195 below the top portion of the teeth 17 of the storage means. A movable stop or abutment 216, FIG. 7, normally held in the path of the movable support plate 196 is provided to limit displacement of the cylinder 195 in a downward direction to a predetermined amount, and is operated to move in the path of support plate 196 to limit movement of cylinder 195. When it is desired to sever the wire, the stop 216 is moved out of the path of movement of the movable plate 196 by de-energizing a solenoid 217 to allow the cylinder 195 to descend to its lowest extreme.

The movement of cylinder 195 past the stop 216 brings the cam 195a into engagement with cam follower 210a which bends the guide tube 186 laterally a small amount to shear the wire 185 between cam follower 210 and cap 212. The spacing between follower 210 and cap 212 is extremely small so that wire from the upper portion of guide 186 will enter the cap 212 when moved downward by the feeding wheel 140. Associated with this tamping assembly are a plurality of switches 218 and 220 which sense the location of the movable plate 196 and thereby perform the function of sensing the position of the cylinder 195. The switch 218 senses the upper or breakout position and the switch 220 senses the tamping and severing position.

The various detents and moving parts of the cable head are operated by means of air pressure controlled by electrically operated valves. Fluid under pressure is supplied from a source (not shown) over an input conductor 224, FIG. 3, to an electrically operated air valve 225 which controls the supply of air to an outlet 235. Extending from the fluid input conductor 224 is a conductor 226 leading to an air valve 227 for controlling the flow of air to an outlet conductor 228 leading to the input tube 215 of the head 192, as clearly shown in FIG. 6. Two lines or conductors 147 and 237 are connected to the output of air valve 225. The line 147 controls the brake 146 for the miter gear 130, while the line 237 controls the fluid operated solenoid 68, FIG. 4.

*Storage teeth (FIG. 9)*

The construction of the storage teeth 17 and the relationship of the guide tube 186 is shown in an isometric view in FIG. 9. A wire 185 has been shown inserted in a pair of the slots 18 across the channel member 250. This wire 185 illustrates the practical realization of laying cable in this type of structure. It is seen that the wire actually proceeds diagonally across the channel member, which would be true for all instances of crossing except in the long longitudinal runs where the angle would be much less than here shown. The angular position of the wire 185 in the retainer 11 is caused by the fact that no wire feeding is done during lateral movement of the wire feed head so that the wire tends to form a straight line between the entrance and exit of the wire from the associated channel. The wires 252 illustrate the stacking of wires one on top of another so that each one is frictionally held between adjacent teeth 17 in slot 18. The teeth 17 are secured to the channel 250 by any desired means such as welding, but it is obvious that they could be bolted, riveted or secured in any other known manner. It is also seen from this view that the guide means 186 passes in close proximity to the upper ends 13 of the teeth 17 during the cable laying operation.

For the operation at the beginning of a wire, the wire feed head is positioned in close proximity to the outside perimeter of the teeth and the tamping cylinder 195 is moved downward to a position below the top portion of the teeth where it is caught by latch 216, FIG. 7. Wire is payed out to a measured length, the tamping cylinder 195 retracts and the wire feed head 67 then moves laterally into the channel dragging the wire through the now associated slot 18. Motion of the wire feed head then causes the wire 185, FIG. 9, to snag and hold in the slot through which it passes. At the terminal end of the wire, the wire feed head again moves laterally outside the perimeter of the teeth 17, the tamping cylinder 195 moves to the position where it is caught by stop 216 and the wire is measured out. At the end of measuring operations, the stop 216 is withdrawn allowing tamping cylinder 195 to descend to its lowest point and sever the measured wire.

General description of electrical circuitry

Figure 10A:
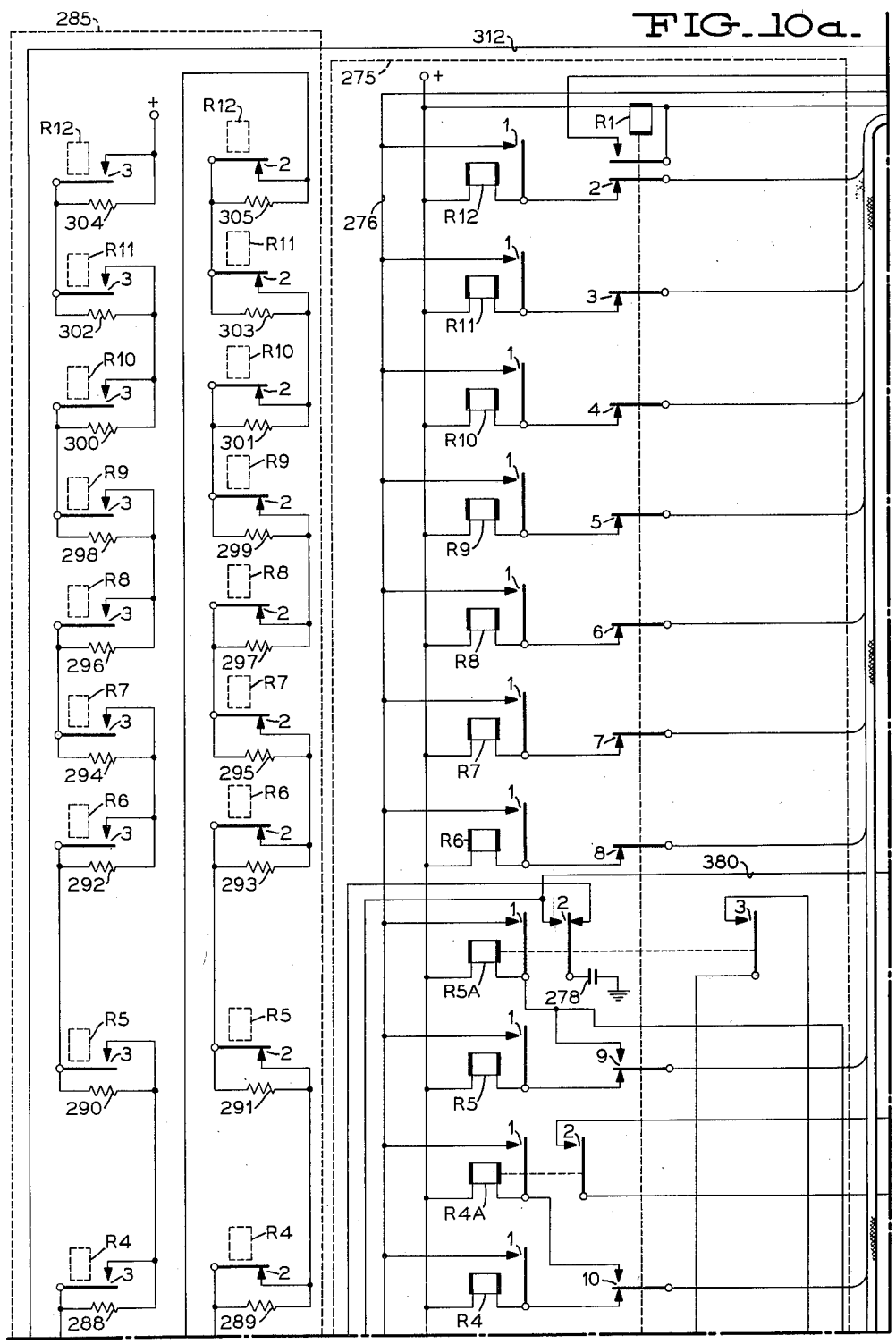
Figure 10C:
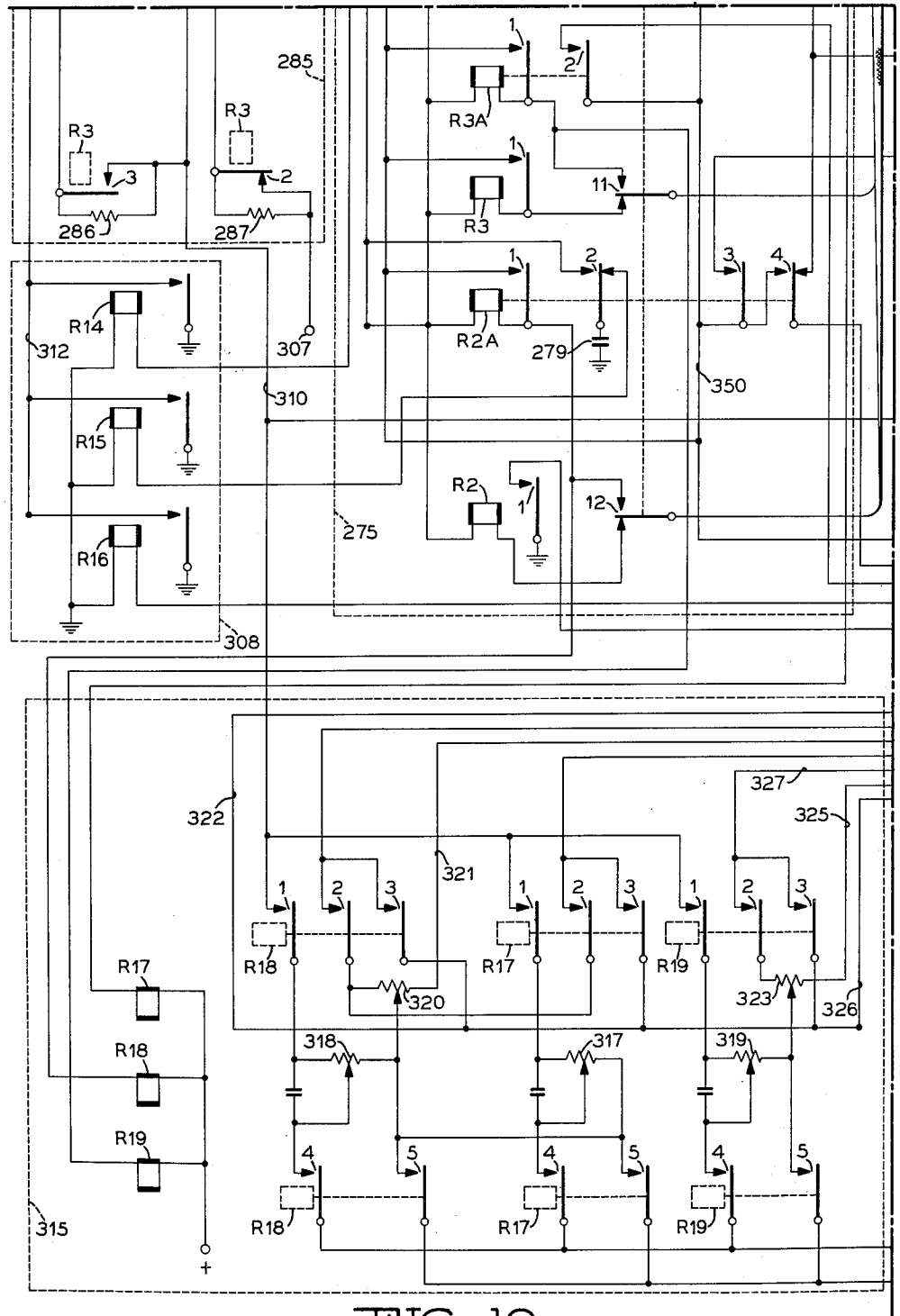

The apparatus used for the electrical circuitry is divisible into the following major components:

(1) Card reader
(2) Relay storage
(3) Digital potentiometer
(4) Switching circuit
(5) Null relay
(6) Motor control
(7) Electrical components on wire feed head and end carriages The electrical circuitry shown in FIG. 10 is arranged from left to right in descending order with FIG. 10c directly under FIG. 10a.

Before proceeding with this description, a card of the type used in this apparatus as shown in FIG. 12 should be considered. As can be seen, the card contains twelve rows and eighty columns. By punching a hole in the appropriate location, a card reading apparatus sensing the card may operate to transmit an indication of the information stored.

While punched cards are described as the medium on which the control information is stored, it is apparent that any other storage device, e.g., magnetic tape, paper punched tape, etc., would operate in the same manner with appropriate reading devices.

To make the description clearer, punchings in the odd columns and even columns have been shown separate, but in actual use, they occur alternately. In the odd columns shown at the left, a hole in row 2 selects the cross feed (lateral feed); a hole in row 3 selects the wire feed servo; a hole in row 4 selects a shear operation while a hole in row 5 selects the longitudinal feed. The even columns contain holes coded in 1—2—4—8 binary coded decimal as indicated. In reading this card, an odd column is sensed first to select the desired component and then an even column to give the quantitative information. After the apparatus has responded to satisfy the conditions represented in the card, the next two columns are read.

In this invention, a number of cards are placed in a card reader (not shown) where they are sequentially read by a number of sensing brushes 385 which move longitudinally over the face of the card and make an electrical connection at each point where there is a hole punched. The information from the card operates to select certain relays of a relay storage device 275 which, in a first instance (odd column), operate to select the desired component of the apparatus and in a second instance (even columns) operates to change the output of a digital potentiometer 285. In all instances of quantitative movement, the output from the digital potentiometer 285 is compared with individual potentiometers associated with the wire feed, lateral feed or longitudinal feed in the switching circuit and the result used in a motor control circuit 330 to move the apparatus associated with the various feeds in the proper direction for a null. A null relay 352 operates when a null is reached to release a detent of a selected component and stop the operation of that component, and to initiate the reading of the next information by the card reader.

Data storage relays

The storage relays in which the data from two columns is stored and utilized is shown inside dotted line 275 of FIGS. 10a and 10c. This apparatus comprises relays R1–R12 and their associated contacts. Relay R1 through its contacts 2–12 function (when relay R1 is energized) to connect the data lines from the card reader to the relays R5A, R4A, R3A and R2A and disconnect the data lines from relays R6–R12. Relay R5A selects the longitudinal feed; relay R4A selects the shear operation; relay R3A selects the wire feed servo and relay R2A selects the lateral feed. Relay R1 has a contact 1 which is a holding contact for this relay and allows the odd column information time enough to set the relays R2A, R3A, R4A, or R5A. When relay R1 is de-energized (even columns of the punched card), all data lines are connected to the relays R2, R3, R4, R5 and R6–R12, which control, with the exception of relay R2, the digital potentiometer 285.

Each contact 1 of every relay, except R2 in the data storage unit, is a holding contact for its associated relay. The contacts 1 make a connection from the ground side of each relay to a line 276 connected to a circuit breaker CB3 in the card reader to supply ground potential for a period of time equal to the time it takes to read two columns of data at the end of which time the contacts 1 open and allow all actuated relays to be released. This is predicated on the situation wherein a null has been reached in the system. For the situation wherein this does not occur before the end of the time period, further means to be described hereinafter are utilized to prevent the data relays from releasing.

Transfer contacts 2 on relays R5A and R2A have their armatures connected to ground through capacitors 278, 279 with the normally closed points connected to the impulse relays R15 and R14, and the normally open points connected to a positive voltage. When either R5A or R2A is operated, either the capacitor 278 or 279 is charged by the positive potential so that when the particular relay which has been operated is released, current will flow through either relay R14 or R15 to cause the same to be operated.

Contact 2 of relay R4A closes a circuit when this relay is actuated to allow the shear mechanism on the wire feed head to operate. Contact 2 of relay R3A operates to connect the wire feed motor 150 into a circuit for operation. Contact 3 of relays R5A and R2A operate to close a circuit to the longitudinal and later feed solenoids which control the detents. Contact 3 of R5A and contact 4 of R2A operate the clutch 337 of the driving motor 96. The eject relay R2, when operated, closes its contact to ground and operates the card reader.

Digital potentiometer

The arrangement of resistors shown in dotted outline 285 of FIGS. 10a and 10c would be, if drawn in a straight line, a series circuit comprising two groups of ten resistors each, with a center tap 310. A first group of even numbered resistors 286 to 304, FIGS. 10a and 10c, has a normally open contact shunting each resistor, while a second group of odd numbered resistors 287 to 305, FIGS. 10a and 10c, has a normally closed contact shunting each resistor. The terminal 307, FIG. 10c, is connected to the negative terminal of a floating power supply and to the resistor 287. The plus terminal of the power supply is converted to resistor 304, FIG. 10a, with the result that with all contacts in their normal state, line 310 has the same negative potential as applied to resistor 287, FIG. 10c, because all resistors in the second group are shunted by their normally closed contacts.

Each resistor in the first even group 286 to 304 is paired with a resistor in the second odd group 287 to 305, and have their shunting contacts actuated by the same relay as shown by the dotted relay coils. Each of the paired resistors has the same value so that when a relay is operated, for example R3, FIG. 10c, resistor 286 will be shunted out while resistor 287 will be connected into the circuit. This allows the series circuit to present the same resistance to the voltage source at all times and prevents fluctuations in the applied voltage with a resulting increase in accuracy of output voltage from the digital potentiometer.

By using resistors 286, 288, 290 and 292 in values which correspond to the binary coded decimal system 1, 2, 4, 8, etc., every decimal value may be obtained by a suitable permutation. Resistors 294, 296, 298 and 300 are related in the same manner as the first group but each is ten times larger than the corresponding binary resistor in the first group so that this second group will indicate tens in the decimal system. Resistors 302 and 304 are each ten times larger than the corresponding resistors 294, 296 in the second group and so indicate one hundred and two hundred, respectively. The highest value which can therefore be indicated on line 310 would correspond to 399 units.

Impulse relays

Figure 10D:
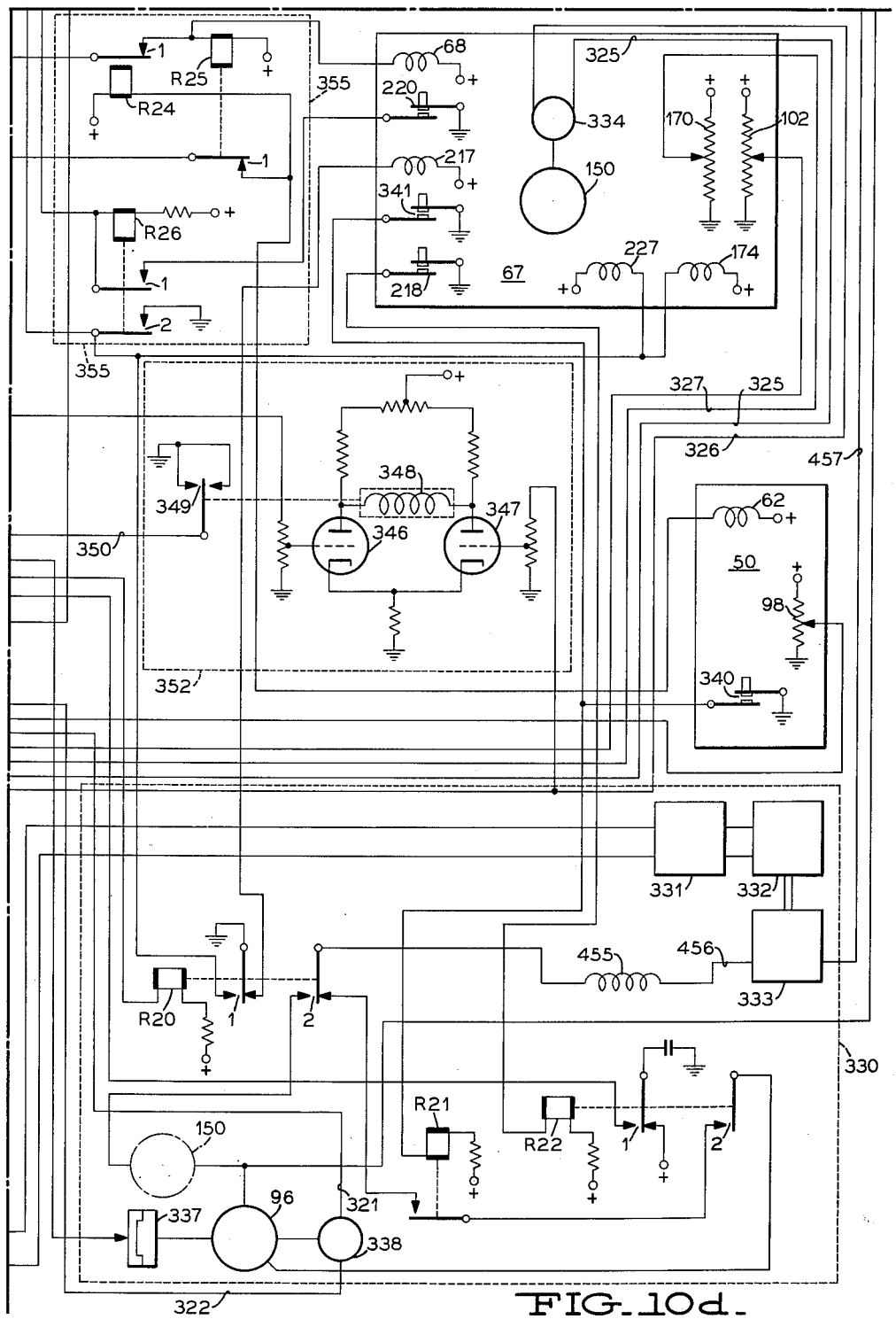

The relays R14, R15 and R16 (dotted box 308, FIG. 10c) are responsive to the release of relays R5A, FIG. 10a, R2A, FIG. 10c, and the release and operation of R22, FIG. 10d. When any of these relays perform their particular function, one of the relays R14, R15 or R16 closes its contact to ground. The contacts are connected in parallel with each and in series with a line 312 connected to the relay R31 in the card reader. When this line is grounded through the contact associated with each relay, the card reader will read the next two columns of information from the card.

Switching network

In FIG. 10c, in dotted line 315, a number of relays R17, R18 and R19 each have a series of contacts 1–5 which operate to connect various parts of the control circuit together. Relay R18 is connected to the input of relay R2A (lateral feed), R17 is connected to the input of R5A (longitudinal feed) and R19 is connected to the input of R3A (wire feed) so that R17, R18 and R19 are operated when R2A, R3A and R5A, respectively, are operated.

The output of the digital potentiometer, line 310, is applied in parallel to all the contacts 1 of the relays R17, R18 and R19 and when one of these relays is closed, the voltage of line 310 is applied to the resistors 317, 318 or 319, respectively. A voltage is applied to contact 2 of each relay representative of the positions of the potentiometer taps located on the wire feed head and end carriages. R17—2 and R18—2 have their armatures connected together at a resistor 320 which is tapped and the resultant voltage applied to the opposite end of the resistor 318 to which the voltage from line 310 was applied. A tachometer voltage from the positioning motor tachometer 338, FIG. 10d, is applied to resistor 320, FIG. 10c, by means of lines 321 and 322.

Contact R19—2 is connected to the wire feed potentiometer 170, FIG. 10d, by means of conductor 327 and the voltage from this potentiometer modified by the tachometer voltage by means of lines 325 and 326 from tachometer 334 is applied to one side of resistor 319, FIG. 10c.

To drive the wire feed motor 150, FIG. 10d, and the drive motor 96, the differences in voltages between the digital potentiometer and the various potentiometers are connected through contacts 4 and 5 of the particular relay R17, R18 and R19, respectively, FIG. 10d, which is applied over a conductor to a differential amplifier 331, FIG. 10d, in the motor control circuit. A connection is made through contact 3 of each of the above relays to the common line 326 also connected to a null relay 352, FIG. 10d.

Motor control

The voltage from the digital potentiometer 285 and the selected function potentiometer 98, 102, or 170 are connected through contacts 4 and 5 respectively of the actuated relay R17, R18, or R19 to the inputs of a conventional differential amplifier 331, FIG. 10d. In amplifiers of this type voltages on incoming lines are compared and the larger input voltage dominates to transmit an output indicative of this fact.

A pair of magnetic amplifiers 332 are controlled by the differential amplifier to furnish an output to a thyratron drive 333.

The thyratron drive comprises two thyratrons connected plate to cathode across an A.C. supply furnished through lines 456 and 457. The output of magnetic amplifiers 332 furnish a positive potential to either one or the other of the thyratrons in circuit 333 so that tube may fire on positive excursions of the applied plate voltage. Since the thyratrons are connected to fire on alternate excursions (positive and negative), current will flow from the drive 333 through line 456 and inductance 455 or in the reverse direction to obtain the required rotation of the motor 96 or 150.

The circuits 331, 332 and 333 therefore sample the voltages from switching circuit 315, select the better or larger voltage, and amplify this signal voltage. These circuits are conventional in motor control and the details form no part of the present invention.

The output from the thyratron drive applied to R20—2 is connected through its normally closed point to a further series of relay points in series with the drive motor 96 and through the normally open point to the wire feed motor 150. It should be noted that motor 150 is shown here for convenience in describing the circuit since it is actually located on the cable head. A voltage is connected from the start circuit, FIG. 10b, to motors 96 and 150 so that R20—2 completes the circuit to one or the other motor.

A conventional clutch mechanism 337 is actuated by closing contact R2A—4, FIG. 10c, or R5A—3, FIG. 10a, in the data storage relays. The tachometer 338, FIG. 10d, which could be a small D.C. generator, is mechanically connected to the drive motor 96 to furnish an output voltage as a function of the speed of the motor.

Relay R20 is connected over a line 322 to R3A—2, FIG. 10c, which, when operated, completes a connection to the contacts 349, FIG. 10d, of the null relay 348 which will operate R20 and connect the thyratron drive to the wire feed motor 150 when there is an unbalance in the system. The wire feed motor 150 is therefore connected to the thyratron drive when the wire feed relay R3A is operated.

Contact R20—1 is normally closed to the release solenoid 217 in the wire feed head 67 to keep this element operated and in an ineffective position so that when relay R20 is energized, the release solenoid 217 de-energizes and the stop 216 connected thereto engages the tamping cylinder 195.

To complete the circuit for the drive motor 96, contacts R21—1 and R22—2 must be closed. Relay R21 is responsive to the actuation of either a longitudinal feed switch 341 or a lateral feed switch 340 so that one must be closed to operate the relay R21. These switches are not shown in mechanical form in the drawings but are connected adjacent the detents 69 and 63 to determine if they have been operated. Relay R22 is responsive to the closing of switch 218, FIG. 7, to insure that the tamping cylinder 195, FIG. 6, is in its raised or elevated position before operating the drive motor 96.

Null relay circuit

The null relay circuit 352 comprises triode tubes 346 and 347 which are responsive to the voltages from the digital potentiometer 285, FIG. 10a, and function potentiometers 98, 102 and 170, respectively. When the voltages on the grids of the tubes 346 and 347 are the same, the coil 348 has equal potentials on each side and its associated contact 349 remains at the de-energized position. When either of the tubes 346 or 347 is unbalanced, contact 349 will close and furnish ground potential to a line 350 and to the hold circuit for the data relays, line 276. The connection from the null relay contacts to line 276 insures that the data storage relays 275, FIGS. 10a and 10d, will remain operated so long as there is an unbalance in the system.

Interlock relays

To avoid dual operation of any of the elements, interlock circuit 355 (FIG. 10d) has been provided. Relay R24 operates when R2A, FIG. 10c (lateral feed) is operated and null relay contact 349, FIG. 10d, is closed through R25—1, R2A—3, FIG. 10c, line 350 and contact 349, FIG. 10d, to ground. R24 opens its contact 1 to open a circuit to the relay R25 and the longitudinal feed detent solenoid 68. A circuit is completed from the null relay contact 349 through R25—1 to the lateral feed detent solenoid 62 to allow the end carriages to move. When relay R5A, FIG. 10a, operates, the converse operation takes place and the wire feed head detent 69, FIG. 10d, is removed.

If relay R4A, FIG. 10a (shear operation) is operated, which only occurs in combination with the operation of R3A, FIG. 10c (wire feed), a circuit will be completed from ground at contact 349, FIG. 10d, through R3A—2, FIG. 10c, to R20, FIG. 10d (R3A operating R20) and from R20—1 through R4A—2, FIG. 10d, to R26, FIG. 10d, to positive voltage. When R26 operates, a hold circuit is completed to the bottom switch 220, FIG. 7, to hold R26 until the tamping cylinder 195 has gone through a shear operation. R26—2 completes a circuit to ground for the tamping solenoid 227 and wire feed potentiometer clutch solenoid 174 so that these two last-mentioned elements are operated.

Card reader

The apparatus used in this invention for reading punched cards is shown and described in Patent 2,615,626 to H. P. Luhn. While the invention is described as using this type of card reader, it is to be understood that any type of card reader could be used with appropriate circuit connections.

The card reader, FIGURE 10b, consists basically of a card hopper (not shown) in which a number of cards to be read are inserted, a transport mechanism for sequentially moving the cards laterally to a position in which reading brush assembly 385 may sense the holes placed in the cards, and a stacker arrangement for the cards once they have been read. In order to simplify the description of the card reader in the present application, only the most pertinent elements have been shown here; the remaining structure can be found in the aforesaid patent. The details which have been shown consist of the various clutch magnets used to move the brushes and punched cards and the switches used to sense the position of the cards in the card reader. In general, the cards are transported to the reading station 386 where the brushes 385 are moved longitudinally over the face of the card and complete circuits whenever a hole is present.

The following mechanical components may be found in the patent to Luhn: Coil 360 is the clutch magnet for the card feed and, when energized, causes any card then present in the reading station to be moved into the stacker and a new card to be transported from the card hopper. Coil 362 is the clutch magnet for the reading brushes which operates to move the brushes from a position where they do not contact the card to a position where they do contact the card. Once operated by coil 362, the reading brush clutch will remain operated until the brushes have reached the end of their travel. Switch 363 is closed when the reading brushes are at their uppermost position to prevent the reading brushes from being moved into contact except at that point. The coil 361 controls the movement of the reading brushes. When this coil is energized, the brushes move over the face of the card. A switch 364 is closed whenever there are cards present in the card hopper available for feeding. The odd and even emitters, 371 and 370, are commutators which have brushes mounted on the reading brush carriage. The brush for each emitter is offset from the other and in the present instance is adapted to generate a pulse for every odd and even column according to whether the emitter is odd or even.

FIGURE 11 is a timing diagram of the circuit breakers CB1–CB8 and a sequence of operations for the various elements of the card reader. A complete cycle of rotation of the circuit breakers is shown and it is seen that this cycle has been broken down into five subcycles. With the exception of CB3 and CB8, all CB's make a connection to ground once in each subcycle. CB3 functions to initiate a reading of two columns of data so that it is necessary that it occur in the first subcycle and in no other place. CB8 is closed throughout most of the cycle and functions to connect ground potential to line 276, FIG. 10b, of the data storage relays to provide a lockup for the actuated relays.

For a typical operation of the card reader, it will be assumed that a card is present in the reading station. A signal over line 312 to a relay R31 at 268° in the main cycle, FIG. 11, will operate this relay to pick its contacts and hold through now closed contact 2, through R33—1, FIG. 10b, to ground. Through the now closed contact 3 of relay R31 a circuit is completed by means of normally closed contacts 4 of relay R32 to CB6 and through normally closed contact 3 of relay R30 and the switch 363 to the read brush coil 362 to positive potential by means of line 380 connected to R5A—2, FIG. 10a. With the read brush clutch 362 actuated to move the brushes into their read position, the microswitch 365 operates to furnish ground potential to one side of the relay R30 to operate this relay which is held by a circuit through R30–1 and microswitch 364 to ground. Relay R30 will therefore remain actuated until feed sense switch 364 is opened.

With reference to FIG. 11, it can be seen that CB3 closes its contacts in subcycle 1 which indicates that card reading is always initiated at the beginning of a full cycle. In the timing diagram, FIG. 11, relay R31, which starts the operation for the two column reading cycle, is shown operated near the end of the fourth subcycle for purpose of illustration. Since relay R31 operated at a time which was past the point at which circuit breaker CB3 was operated, the circuit must wait until the following cycle. In this cycle, when the circuit breaker CB3 operates, ground potential will be furnished through the now closed contact 2 of relay R30, FIG. 10b, through the closed contact 1 of relay R31 to the normally closed contact 3 of relay R32 to a mechanical latch pick relay R28 to positive potential. When energized, this latch pick relay will operate and be held up by mechanical means, not shown, and remain in its set state until unlocked by the latch trip relay R28A which is a mechanical part of the latch pick relay R28. This type of relay is old in the art and it is not considered necessary to describe it in detail. When relay R28 operates, a circuit is closed through its contact 1 to the circuit breaker CB4 and on the other side to relay R29 which operates at the next closing of circuit breaker CB4.

When relay R29 operates during subcycle 1, a plurality of contacts R29—1–5 are closed. Contact 1 is connected to CB5 to form a hold circuit for the relay R29 which is longer in time than the circuit from R28—1 and CB4. Contact 2 is connected to CB7 and to the odd emitter 371 through R29—5 and to the relay R1 of the data relay storage device 275. The contact 3 connects the circuit breaker CB1 to the read brushes for reading the holes contained in the card columns, while the contact 4 connects CB2 to the even emitter which is connected through a normally closed stop switch 375 to the latch trip relay R28A and to the parallel connected relay R33. Taking the connections one at a time, it can be seen that the odd emitter 371 is connected to circuit breaker CB7 and operates relay R1 on the odd column. It will be remembered that the operation of the relay R1 transferred its transfer points to connect the relays R5A, R4A, FIG. 10a, R3A and R2A, FIG. 10c, to the reading brushes 385, FIG. 10b, so that the information contained in the odd columns of the card could select the desired component. The time of closure of CB7 is very short (end of subcycle 1, beginning of subcycle 2) but relay R1 is locked up by means of its contact 1 which is connected to CB2.

Since the first column to be read is always the odd column, the odd emitter always actuates the relay R1 during subcycle 2. In the next succeeding subcycle, the circuit breaker CB1 will pulse the even column of the card reading brushes to transmit the information from the card to the data relays, FIGS. 10a and 10c, relay R1 having released its transfer points. At this point, it should be further pointed out that the card reading brushes travel continuously from the top of the card to the bottom thereof so long as the read clutch magnet 361, FIG. 10b, is energized. When the even emitter transmits a pulse to the latch trip relay R28A, it opens the circuit to the relay R29 and the read clutch 361 which stops brush movement. The contact R29—1, however, which is connected to CB5, keeps relay R29 operated until CB5 opens its circuit.

When relay R33 is operated by the even emitter, the normally closed point 1 of R33 opens and the holding circuit through the contact 2 of operated relay R31 is open so that relay R31 drops out. When relay R31 drops out, the circuit to R28 is opened so that R28 will not latch up. When the operation of the apparatus has been completed, a pulse is transmitted from the impulse relays R14, R15 or R16, FIG. 10c, to the relay R31, FIG. 10b, and the cycle of operation is repeated until the next even column. It is therefore seen that the process of reading the cards is performed in groups of two columns so that the normal reading operation comprises forty card reading cycles. At the termination of all card columns to be read, a hole is placed in the eject column of the card which operates relay R2, FIG. 10c. When R2 operates, contact R2—1 connects ground potential to relay R32, FIG. 10b, which closes a circuit to a feed clutch 360 to actuate the clutch to feed another card.

*Start circuit*

A main switch 388 is closed to connect 220 v. A.C. to a stepdown transformer 389 which supplies 110 v. to terminals 393 to furnish the proper potential the card reader motor (not shown). Line 391 is paralleled and connected to a point between lamps 395 and 396, to a resistor 398 and to a coil 408. A thermal contact 399 is closed by the heat from the resistor 398 connected from the line 391 to ground which allows sufficient time for the components of the system to be warmed to operating temperature. When contact 399 is closed, a circuit is completed to lamp 396 "Ready" so that the operator may then close the "Start" switch 405. When the start switch is closed, lamp 395, "Power On," is illuminated by a circuit extending from ground, through contact 399, switch 405, lamp 395 to line 391.

The coil 408 controls power to the motor control circuit 330 through contact 408—1. When switch 405 is closed, a circuit is completed from line 391, through the coil 408, switch 405 to contacts 399 so that coil 408 is energized. Contact 408—2 controls a holding circuit for coil 408 through 410—1, contact 406 to contact 399, thus start switch 405 need be only a momentary contact type switch. When 408—2 closes, a circuit is completed through a coil 410 to the thyratron drive 333, FIG. 10d. The coil 410 acts to open the thyratron drive circuit 333 when there is more than a predetermined amount of current drawn by the thyratron drive and thus acts as an overcurrent protection device.

*Operation*

Assume that all elements of the "Start" circuit have been operated and power is being furnished to the circuit with the wire feed head 67 being located at the midpoint of channel 16, FIG. 13, and the wire 29 being the one which is then being laid. The punched card will have a hole in the next odd column in row 2 (cross or lateral feed servo) and a required permutation of holes in the next even column for the distance from the midpoint of channel 16 to the terminal point 48.

Depending upon the cycle point of the circuit breakers in the card reader, a pulse from one of the impulse relays 308 will operate the relay R31, FIG. 10b, to pick R28 when CB3 next closes its contacts. When R28 operates, it closes a circuit to R29 which operates and closes a circuit to the emitters. Since the first row always read is an odd column, a pulse from odd emitter 371 operates relay R1, FIG. 10a, to connect the relays R2A, R3A, FIG. 10c, R4A and R5A, FIG. 10a, to the reading brushes 385, FIG. 10b. A connection from CB2 to the hold contact of R1, FIG. 10a, insures that this relay will remain operated until CB2, FIG. 10b, opens its contacts. CB1 closes its contacts and furnishes ground potential to the reading station. With a hole in row 2, the relay R2A, FIG. 10c, is operated to hold through the line 276 and CB8 or 350, FIG. 10b.

Relay R2A, FIG. 10c, transfers its contact 2 to positive potential and charges capacitor 279. Contact 3 establishes a circuit to the cross feed detent solenoid 62, FIG. 10d, while contact 4 completes a circuit to the drive motor clutch 337. A connection from the contact R2A—1, FIG. 10c, completes a circuit to R18 which closes its contacts and connects the output from the digital potentiometer 285 and the lateral feed potentiometer 98 together and completes a circuit to the amplifier 331. Relay R20 is not energized so that the drive motor 96 is connected to thyratron drive 333 by means of R20—2, R21—1 (operated since the longitudinal feed switch 341 is closed) and R22—2 (operated since tamper up switch 218 is closed).

While all these components were operating, the card reader will have read the next column of data (even). The relay R1, FIG. 10c, will drop out when CB2, FIG. 10b, opened its contacts (subcycle 2) so when CB1 next closes its contacts (subcycle 3), the reading brushes 385 are connected to the relays R2, R3, R4, R5 and R6–R12, FIGS. 10a and 10c, to be operated in accordance with the holes contained in the card in this column. The operated relays control the digital potentiometer to vary the output voltage in accordance with the permutation code contained in that column. The output voltage line 310 in conjunction with the voltage from potentiometer 98 determines the direction in which motor 96 will operate.

When a null is reached, the motor 96 is declutched and no signal will be furnished to the amplifier 331 by the switching circuit 315, FIG. 10c. The detent 62, FIG. 10d, operates and the end carriages 50 and 51 are locked in place. The wire feed head 67 is now just outside channel 16.

When CB3 opens its contacts and removes ground from the locking contacts of the data storage relays, all relays are released. When R2A, FIG. 10c, de-energizes, contact 2 and capacitor 279, which was charged, is closed to complete a circuit to R15 which closes its contact to furnish ground potential to R31 to start the card reader for reading the next two columns of data.

For measuring and severing the breakout wire at 48, FIG. 13, holes are punched in rows 3 and 4 of the odd column and the quantitative information for the breakout is punched into the next successive even column.

The sequence of operations in this case is similar to the cross feed sequence except that relays R3A and R4A, FIGS. 10a and 10c, respectively, are energized. R3A operates R20, FIG. 10d, to complete a circuit to the wire feed motor 150 while R4A, FIG. 10a, through its contact 2 and R20—1, FIG. 10d (now closed to ground) completes a circuit to R26. R26—1 forms a locking circuit for R26 through the switch 220, FIG. 7. R26—2 operates to hold the air valve tamping solenoid 227 and wire feed potentiometer clutch 174 operated so long as R26 is operated.

When a null is reached for the wire feed motor 150 (same operation as for drive motor) the contact 349, FIG. 10d, will release and remove ground from all data relays which allows R20 to drop out. When R20—1 assumes its normal position, ground is connected to the release solenoid 217 to allow the tamping cylinder 195 to complete its stroke and sever the wire.

When the data relays are released, relay R26 will be de-energized when the tamper breaks the hold circuit to R26 through the switch 220. With R26—2 now open, ground will be removed from tamping solenoid 227 and potentiometer clutch 174 to allow the tamping cylinder to resume its normal raised position and allow the wire feed potentiometer 170 to assume its zero position.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A wire laying apparatus comprising, a wire feed mechanism, means for slidably mounting said mechanism on horizontal guides above an area where wire is to be laid, carriage means for movably supporting said guides whereby said mechanism is movable in a coordinate manner, wire dispensing means mounted on said mechanism, means connecting said wire dispensing means to said guides to provide operating movement to said dispensing means as said wire feed mechanism is moved relative to said guides, motor means, means selectively connecting said motor means to said dispensing means to operate the same at terminal points, measuring means selectively connected to said dispensing means for measuring wire and providing an indication of the length of wire as dispensed by said motor means, control means indicating a length of wire to be dispensed by said mechanism, and means responsive to equal indications from said control means and said measuring means to terminate operation of said motor whereby predetermined lengths of wire may be dispensed at predetermined terminal coordinate positions.

2. The apparatus of claim 1 wherein said wire dispensing means further comprises a guide tube through which wire is passed, said guide tube comprising a laterally movable portion to sever said wire, a cam follower fixed to one of said movable guide portions, and camming means movable longitudinally to engage said cam follower to move said movable guide portion to sever said wire.

3. The apparatus of claim 2 further comprising a concentric cylinder movable longitudinally to said guide means and transversely to the area in which said wire is to be laid, operating means connected to said concentric cylinder and operable at said terminal points to move said cylinder in a direction transverse to said point at which wire is to be laid, said camming means being mounted internally of said concentric cylinder and proximate to said cam follower whereby down motion of said concentric cylinder will guide said wire to the desired coordinate position.

4. The apparatus of claim 3 further comprising coordinate position means for said wire feed mechanism including a cable connected to each end of said feeding mechanism longitudinally to the direction of coordinate movement provided by said mechanism relative to said guides, bearing surfaces contained on each of said carriages about which said cables are fixed, bearing surfaces fixedly mounted laterally to the coordinate direction of movement of said guide about each one of said cables is fixed, locking means contained on said wire feed mechanism to fix the same relative to said guides, locking means contained on said carriages to fix the same, and means for taking up one of said cables while paying out said other cable whereby actuation of one locking means provides coordinate movement to the unlocked carriage or mechanism.

References Cited in the file of this patent
UNITED STATES PATENTS

| | | |
|---|---|---|
| 667,195 | Davis | Feb. 5, 1901 |
| 1,738,710 | Jones | Dec. 10, 1929 |
| 1,823,680 | Curtiss | Sept. 15, 1931 |
| 1,961,991 | Southwell | June 5, 1934 |
| 2,082,099 | Cruser | June 1, 1937 |
| 2,403,099 | Lear | July 2, 1946 |
| 2,805,471 | Lowden | Sept. 10, 1957 |
| 2,862,670 | Mallina | Dec. 2, 1958 |
| 2,862,671 | Dimond | Dec. 2, 1958 |
| 2,921,607 | Caveney | Jan. 19, 1960 |
| 2,925,170 | Rath | Feb. 16, 1960 |